(12) United States Patent
Patel et al.

(10) Patent No.: US 11,140,193 B2
(45) Date of Patent: Oct. 5, 2021

(54) DEVICE CYBERSECURITY RISK MANAGEMENT

(71) Applicants: Jigar N. Patel, West Chester, OH (US); Pranav N. Patel, West Chester, OH (US)

(72) Inventors: Jigar N. Patel, West Chester, OH (US); Pranav N. Patel, West Chester, OH (US)

(*) Notice: Subject to any disclaimer, the term of this patent is extended or adjusted under 35 U.S.C. 154(b) by 56 days.

(21) Appl. No.: 16/734,318

(22) Filed: Jan. 4, 2020

(65) Prior Publication Data

US 2021/0211452 A1 Jul. 8, 2021

(51) Int. Cl.
*H04L 29/06* (2006.01)

(52) U.S. Cl.
CPC ...... *H04L 63/1433* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 8,973,088 | B1* | 3/2015 | Leung | H04L 63/20 726/1 |
| 9,178,905 | B1* | 11/2015 | Adams | H04L 63/1416 |
| 9,727,738 | B1* | 8/2017 | Kuhr | G06F 8/658 |
| 2006/0004614 | A1* | 1/2006 | Hutchinson | G06Q 10/10 705/7.27 |
| 2007/0169199 | A1* | 7/2007 | Quinnell | G06F 21/577 726/25 |
| 2014/0074644 | A1* | 3/2014 | Nam | G06Q 30/08 705/26.3 |
| 2014/0237545 | A1* | 8/2014 | Mylavarapu | H04L 63/1433 726/3 |
| 2014/0283083 | A1* | 9/2014 | Gula | H04L 63/1433 726/25 |
| 2015/0172307 | A1* | 6/2015 | Borohovski | H04L 63/1408 726/25 |
| 2018/0103054 | A1* | 4/2018 | Cran | H04L 63/20 |
| 2019/0172026 | A1* | 6/2019 | Vessenes | H04L 9/3247 |
| 2020/0067965 | A1* | 2/2020 | Dada | H04L 63/20 |
| 2020/0117807 | A1* | 4/2020 | Nadgowda | G06F 8/65 |
| 2020/0394309 | A1* | 12/2020 | Angelo | H04L 9/30 |

* cited by examiner

*Primary Examiner* — Kaveh Abrishamkar

(57) ABSTRACT

A method for implementing cybersecurity risk management for network connectable devices is disclosed. The method involves device vulnerability and risk assessment, risk remediation, compromise detection and incident response. The vulnerability and risk assessment consider both technical and human factors. The method also includes using crowdsourcing methods, such as games and gamification, standalone or in combination with other technologies for inventory development, risk assessment and compromise detection. The risk remediation/mitigation and incident response include prioritized role and skill-based execution of security controls and incident responses, wherein security controls and incident responses can be selected from multiple options based on effectiveness and cost. The method further involves governance of the risk management process in an entity.

20 Claims, 7 Drawing Sheets

DEVICE CYBERSECURITY RISK MANAGEMENT

BACKGROUND

Various aspects of the present disclosure relate generally to managing cyber related risks to network connectable electronic devices, and more particularly to assessing cyber related risks to electronic devices (including special purpose electronic devices), managing the device level cybersecurity profiles over time for more accurate and current risk assessments, remediating or mitigating the risks, governing the remediation or mitigation workflows, combinations thereof, etc.

Cyber-attacks are malicious acts that target computer information systems, infrastructures, computer networks, "internet of things" (IoT) devices, connected operational technology (OT) devices, and other computing devices. The IoT generally refers to a network of physical devices such as appliances, special purpose devices, and other items that connect to, and exchange data over, a network (e.g. the Internet). The OT generally refers to hardware and software that detects or causes a change through the direct monitoring and/or control of physical devices, processes and events in an enterprise. Cyber-attacks allow bad actors direct or indirect unauthorized access to susceptible devices and/or systems to perform one or more reprehensible acts such as stealing information, causing devices and/or systems to malfunction, making alterations to data, corrupting or destroying information, spying, holding information or access for ransom, etc. In this regard, cyber-attacks can affect safety, availability of devices and/or systems, and integrity and confidentiality of data and/or information. Cybersecurity of such connected devices is highly dependent on the accurate and timely identification of all risks. Accordingly, entities highly susceptible to cyber-attacks may employ a comprehensive and dynamic risk assessment process and system for enhanced risk management.

BRIEF SUMMARY

According to aspects of the present disclosure, a dynamic cybersecurity risk management process for network connectable electronic devices is disclosed. The process comprises creating a device risk profile for each of a plurality of electronic devices, where each device risk profile includes parameters that either indicate or contribute to the probability of one or more adverse cyber incidents taking place and/or potential impacts of the incidents if they materialized. The device risk profile can include information indicating device bill-of-material-level vulnerabilities, device configuration-related vulnerabilities, vulnerabilities created by the environment that the device operates in, other relevant human-factor-related vulnerabilities, criticality of the device in the given operation, combinations thereof, etc.

Moreover, the process involves creating a profile for each of a plurality of individuals or groups that would interact with a given device, where each profile can include parameters indicating an individual's or group's cybersecurity-related knowledge proficiency, emotional state, passion for the work, capacity (e.g. current workload), etc. These individual or group profiles are correlated to the risk profiles of the devices they interact with to indicate human-factor-related vulnerabilities.

According to further aspects of the present disclosure, a process of obtaining parameter values for the profiles is disclosed. The process can use available network or system scanning technologies or tools, dedicated data collection resources, surveys including knowledge testing, and crowd-sourcing via gamification, gaming, and combinations thereof to obtain parameter values. The parameter values are actively and/or periodically monitored and updated with changing conditions.

Further, according to aspects of the present disclosure, the device risk profiles can also include threat indicators. Threats include, but are not limited to, privilege escalation, vulnerability exploitation, phishing, combinations thereof, etc. Privilege escalation is the exploitation of a flaw in a system for the purpose of gaining unauthorized access to protected resources. Hence, the threat indicators can be generated by analyzing previously, more importantly very recently, exploited conditions during cyber-attacks. The process includes accessing a data source, the data source having a collection of root-cause conditions of previous cyber-attacks. These conditions can be at device bill-of-material, configuration, environment, human factor, or combinations thereof, levels. The process includes actively and/or periodically accessing the data source, analyzing the data, and updating threat indicator values in the device risk profiles.

Moreover, the process involves (i) assigning at least one management decision and activity to remediate each vulnerability, mitigate the associated risk, or accept the risk, and (ii) either selecting or prescribing a response action if the risk associated with each vulnerability materialized into an actual adverse event. The management decision authority and responsibilities for associated work activities can be skill and/or role based in an entity. The vulnerability remediation or risk mitigation actions can be broad in nature and depend heavily on the type of a vulnerability or risk. They can include, but are not limited to, training and awareness, patching, encrypting data, enhancing password policies, altering network configuration, institutionalizing a new workflow, adding physical security, combinations thereof, etc. The process also includes maintaining profiles of the individuals who would make relevant vulnerability and/or risk-management-related decisions, carry out vulnerability and/or risk management activities, and make decisions or perform activities associated with a response mechanism during a cyber-attack. The individuals' profiles further contribute to the device's risk profile to indicate human-factor-related vulnerabilities.

Further, the process involves tracking all risk management activities and generating relevant dashboards for governance. The dashboards can include information such as risk levels for each device, overall organizational risk from all devices, organizational risk trend, vulnerability or risk management activities status, cycle-time for risk mitigation/remediation activities by vulnerability or risk, resource constraints in the risk management process, combinations thereof, etc.

Further, according to aspects of the present disclosure, all incident response actions can be treated as knowledge modules that can be available for use, with further customization if needed, by the user(s) in any entity during events involving similar vulnerability-exploiting attacks. Similarly, all successful security controls can also be treated as knowledge modules that can be available for use, with appropriate customization if needed, across multiple entities.

In addition, the process includes building and maintaining a cyber incident database. The database can store root-cause information generated from the postmortem activities after each cyber-attack. The root-cause information can include device bill-of-material-vulnerabilities, environmental conditions, certain human factor conditions, combinations thereof, etc.

DETAILED DESCRIPTION

Introduction

Figure 1:
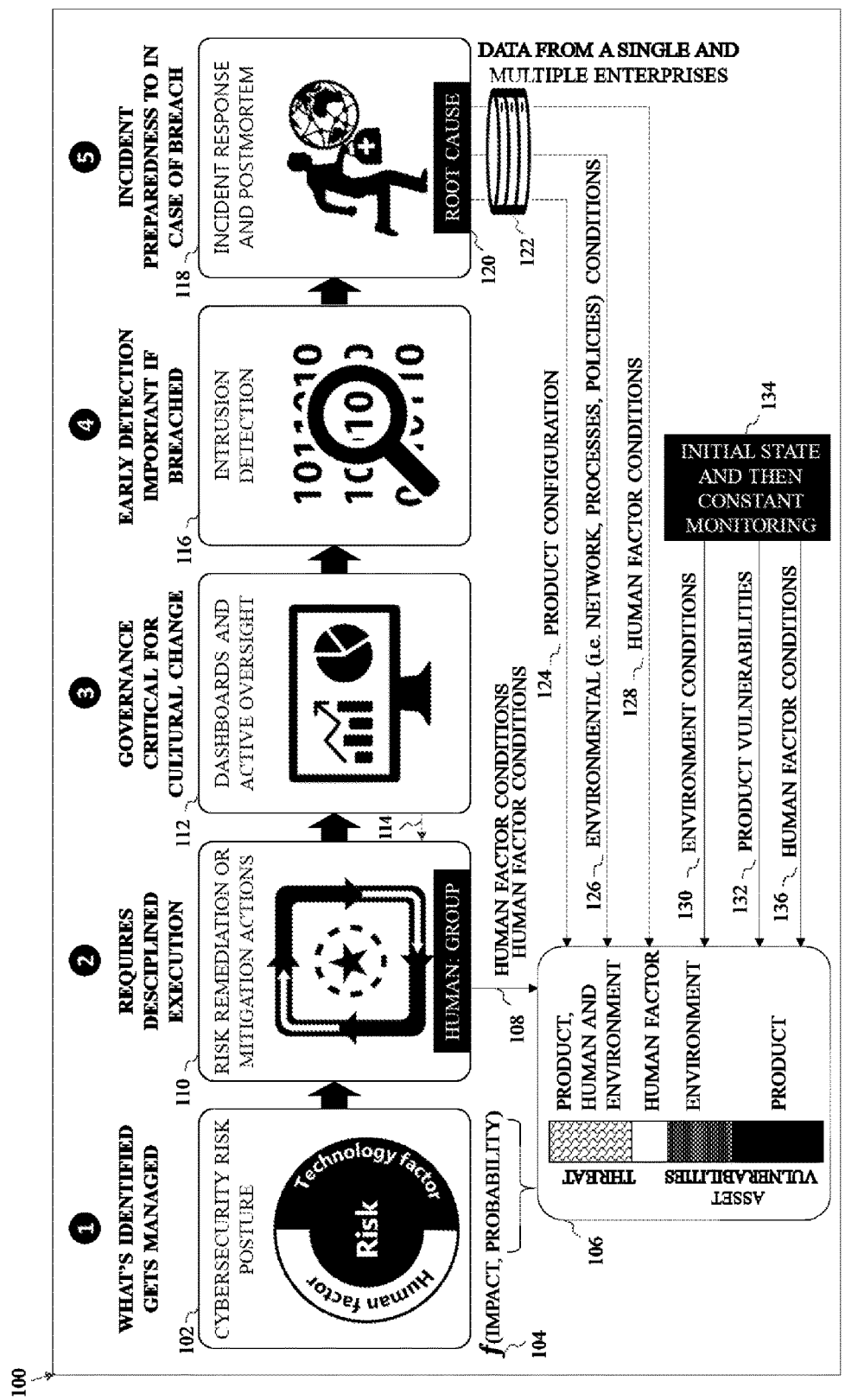
FIG. 1 illustrates a system and process of device cybersecurity risk management according to aspects herein.

Various aspects of the present disclosure are generally directed toward improving device risk management. In addition, further aspects of the present disclosure are generally directed to using one or more data capture modes, including use of gamification, and incorporating threat indicators to provide current and comprehensive device level cybersecurity risk indication that includes both technical and human-factor considerations. Aspects of the present disclosure are also directed to role and/or skills-based decision making and work activities for risk remediation/mitigation and cyber-incident response as well as governance. The present invention is described in enabling detail in the following examples, which may represent more than one embodiment of the present invention.

From a practical standpoint, nearly every entity including corporations, associations, homes, government organizations, small businesses, infrastructure, etc. have devices or systems including, but not limited to, computers, phones, laptops, "internet of things" (IoT) devices, operational technology (OT) devices, various special purpose computing devices, etc. connected to some form of a network. The network can span from having a standalone network that connects two or more devices in a peer-to-peer communication setting or in a personal area, to a network connecting millions of devices spread across the entire globe. The networks are generally categorized as Peer-to-Peer (P2P) Network, Tiered Network, Personal Area Network (PAN), Local Area Network (LAN), Metropolitan Area Network (MAN), Wide Area Network (WAN), etc. The IoT generally refers to a network of physical devices such as appliances, special purpose devices, and other items that connect to, and exchange data over, a network (e.g. the Internet). The OT generally refers to hardware and software that detects or causes a change through the direct monitoring and/or control of physical devices, processes, and events in an entity. These connected devices/systems are critical for the effective functioning of many of the infrastructures as well as efficiencies of many workflows in the daily lives of people. Cyber-attacks involving vulnerable devices/systems or associated networks allow bad actors direct or indirect unauthorized access to perform one or more reprehensible acts such as stealing information, causing devices and/or systems to malfunction, making alternations to data, corrupting or destroying information, spying, holding information or access for ransom, etc. In this regard, cyber-attacks can affect safety, availability of devices and/or systems, and integrity and confidentiality of data and/or information. Hence, all entities directly, indirectly, or intuitively are challenged to identify and manage the device cybersecurity risks faced by them.

As a result, many entities seek to first accurately identify their inventory, applications and locations of their devices and then track them at least periodically if not in real time. However, they face several challenges in fulfilling this need.

Most entities lack a comprehensive inventory of their devices that includes Internet Protocol (IP) addresses and all Media Access Control (MAC) addresses. Each device or system can have more than one unique MAC address. While an active and/or passive network scanning operation can generate a list of IP and communicating MAC addresses of all network connected devices in an entity, the entity still needs an inventory table that links those MAC addresses and IP addresses to actual devices (e.g. make, model, etc.) and their applications (e.g. a security camera, a printer, a machine, etc.) to understand associated risks. Further, if the entity did not have all MAC addresses associated with a device in the inventory table, the network policy could potentially reject the device, if the identified communicating MAC address was not in the inventory table, by considering the device as a foreign device; it would lead to disruption in the activity performed by this genuine device.

Similarly, while an IP address could be used to identify the approximate location of a device, it would be difficult to pin-point the actual physical location of the device on a network segment that connects many devices across a large physical area.

Moreover, a network scanning operation requires access to the devices and/or the data flow to capture relevant information. Hence, when there are many separate (i.e. air-gapped) networks or even network segments, the scanning operation can become costly by requiring separate access to each network or network segments.

Further, a passive network scan can miss detecting devices that are not directly connected to the network, but are only connected to devices that are connected to the network (i.e. P2P).

Further, many of the network connectable devices are not always connected. These devices can be missed if they are not connected (or powered "ON") during the time of a scan.

Furthermore, mobile device management can become more difficult and costly because they can connect to different networks/subnetworks at different times.

Many devices, especially the special purpose and OT devices, can crash, hang, or reboot as a result of an active scan. Hence, operational disruption is feasible if a scan is performed while these devices are engaged in mission-critical activities.

Cybersecurity of such network-connectable devices is also highly dependent on accurate and timely identification of all risks. Risk represents the probability of at least one of the vulnerabilities to be exploited in a cyber-attack and the resulting impact to the entity. Hence, entities seek to identify all vulnerabilities and threats associated with a device, and prioritize them on the basis of associated risk levels. While entities can estimate potential impact of a cyber-attack on a device, they often struggle to comprehensively identify vulnerabilities associated with the installed device and actively monitor for vulnerabilities over time. Their efforts tend to be limited to identifying some of the vulnerabilities associated with a device's bill-of-material (e.g. operating systems, software, etc.) via vulnerability scans where applicable, and/or intelligence gathered from various trusted public sources (e.g. manufacturer or software-developer-published vulnerabilities, government-published vulnerabilities, industry-association-published vulnerabilities, etc.). These entities can also gather limited installed-base-level vulnerabilities such as open ports, vulnerable software services running on the ports, etc. when a vulnerability scan is feasible. Many entities, however, struggle to identify most, if not all, of the device-bill-of-material-level vulnerabilities, vulnerabilities specific to the environment in which the device is deployed (e.g. configuration and security of the network to which the device is connected, the entity's password management policy, if the device is monitored remotely, if a portable device can be easily stolen, if a policy/process exists to check for malicious code after the device is back from maintenance/repair, etc.), and vulnerabilities arising from various human factors (e.g. knowledge specific to cybersecurity, behavior and mood of the device operator, etc.).

Further, entities may choose to mitigate/remediate the identified risks to ensure the desired level of cybersecurity. In this regard, cybersecurity is also dependent on the quality and timing of risk mitigation/remediation. In many cyber-incidents, while entities were aware of particular vulnerabilities, they had not gotten around to remediate them before the attacks took place. Moreover, in many cases, bad actors were able to exploit misconfigured cybersecurity controls such as weak/default passwords, faulty scripts, incorrect permissions, a faulty firewall configuration, a faulty storage configuration, a missing isolation, an inconsistent system integration, revealed information, etc. Root causes of these misses included the sheer number of devices, confusion around roles and responsibilities among relevant individuals, under-developed processes, lack of resources, etc. Some of these challenges may only get worse with regards to IoT, OT or other special purpose devices because of the required cross-functional coordination in risk management. In this regard, entities may choose to address institutional, organizational, and personal factors to improve the quality of risk mitigation/remediation decisions and associated work activities.

Thus, the present disclosure is directed towards processes and systems for improved device cybersecurity risk management considering not only the technical factors but also the emerging challenge of human factors. In this regard, aspects of the present disclosure utilize unconventional approaches such as incentive-based crowdsourcing including surveys, gamification, and gaming to accurately identify and track inventory, applications, and locations of devices. Further aspects of the present disclosure are directed towards gathering and actively monitoring various risk-contributing parameter values for device risk profiles using conventional technologies such as vulnerability scans and/or intelligence gathered from various trusted public sources, unconventional approaches such as incentive-based crowdsourcing (e.g. gamification) and gaming, or combinations thereof. Moreover, aspects of the disclosure herein include threat indicators in device risk profiles to provide a current and far more comprehensive device-level cybersecurity risk indication. Concerning institutional, organizational and personal factors in cybersecurity, aspects of the present disclosure are directed to role and/or skills-based decision making, work activities, and learning, including use of games where applicable, in risk mitigation/remediation and cyber-incident response.

Device Cybersecurity Risk Management System

Referring now to the drawings and in particular FIG. 1, a system diagram 100 for the device cybersecurity risk management method is illustrated according to various aspects of the present disclosure. Components of the method and system 100 are introduced first, and then the components are discussed in greater detail herein.

According to various aspects of the present disclosure, the method 100 operates mostly on principle of "what gets measured gets managed." As shown, the first step in connectable-device cybersecurity risk management method 100 is to identify each of a plurality of electronic devices in the entity and build their individual cybersecurity risk postures 102. The cybersecurity risk posture 102 refers to the device's overall cybersecurity strength and can be represented by a risk score that is generated based on the device's risk profile. Risk is defined as a function 104 of probability and impact. The probability is the likelihood of a cyber-attack occurring and the impact is the consequence of a cyber-attack exploiting a device vulnerability. Hence, a device risk profile can include parameters that indicate probability of a breach and potential impacts associated with the breach. In other words, the device risk profile can include vulnerabilities and threats associated with a device, criticality of the device in a given operation, a combination thereof, etc. The risk profile can also include information such as device identification (e.g. make, model, serial number), application, location, utilization level, etc.

Further, the method 100 comprises identifying vulnerabilities and threats 106 associated with each of a plurality of electronic devices in the entity. Some of the vulnerabilities 106 can emerge from device bill of material (e.g. operating systems, software, etc.), how a device is designed, and/or how its features are offered—i.e. they are inherent to the device irrespective of how the device is installed, configured, or operated. These vulnerabilities are referred to as product (or product-level) vulnerabilities herein. There can be vulnerabilities transpiring from how a device is deployed into an environment, configured, or a combination thereof. Whether the device is deployed into a segmented network, communication to the device is authenticated, data encryption is enabled, the device is monitored remotely, organizational policy requires unique user-specific credentials to access the device, a policy/process exists to check for malicious code after the device is back from maintenance/repair, the device has open USB port(s), etc. are some of the examples of such vulnerabilities. These vulnerabilities are referred as environmental-conditions-induced or environment-related vulnerabilities herein. Other vulnerabilities can result from various human factors such as knowledge, emotional state, capacity, etc. of each operator of a device, each designer and maintainer of the network involving the device, each configurer of the device, each life cycle manager of the device, any other person whose work directly and indirectly impacts the device, combinations thereof, etc. All of these vulnerabilities (i.e. product, environmental conditions-induced and human factor) combined are referred as asset vulnerabilities herein. Additionally, the device risk profiles can also include threat indicators. The threat indicators can be generated by analyzing previously exploited conditions via cyber-attacks (i.e. root causes 120).

Further according to aspects of the present disclosure, the process involves gathering and recording various information (or parameter values) into the device risk profile at the onset 134 and continuously, or at least periodically, thereafter 134. It can also involve identifying devices (e.g. make, model, etc.), and their locations and applications in the entity. The information pertaining to a device can include environmental conditions 130, product vulnerabilities 132 and/or human-factor conditions 136 (also see reference number 108).

Further, the process includes accessing a data source 122, the data source 122 having a collection of root-cause conditions 120 of previous cyber-attacks from at least one entity. These root-cause conditions 120 could include certain product configurations 124, product vulnerabilities, environmental conditions 126, human-factor conditions 128, and/or combinations thereof. The process involves recording these conditions as threat indicators into the device profile 106. The method 100 involves postmortem analysis 118 after every cyber-incident to identify root-cause conditions, and the outcomes can be stored in a database 122. Moreover, the process includes continuously, or at least periodically, accessing the data source 122 and updating threat indicator values in the device risk profiles.

According to various aspects of the present disclosure, device risk mitigation/remediation activities 110 can be prioritized for each of a plurality of network-connectable devices in the entity based on their individual risk scores starting with the highest risk score devices. Again, the risk scores represent cybersecurity risk postures 102 and are generated based on information in the device risk profiles.

Further, a device risk profile can include multiple vulnerabilities and threats, each contributing a varied level of risk to the overall device risk posture. In this regard, the process 100 includes assigning (prescribing or selecting from the available best practices or "knowledge modules" by accessing a data source, the data source having a collection of successful security controls from at least one entity) at least one management action to each vulnerability, threat, or risk-driving parameter that avoids, transfers, remediates, or mitigates the respective risk, or prescribes breach verification and response actions if the risk materializes into an actual adverse event. Hence, a management action can be viewed as a solution/control (i.e. security control). A potential incident response action can still be prescribed (or selected from the available best practices, or "knowledge modules", by accessing a data source, the data source having a collection of successful incident responses 118 from at least one entity) when some residual risk exists even after implementing at least one management action. A return on investment (ROI) mindset can be applied in selecting and prioritizing at least one management action for each vulnerability, threat, or risk-driving parameter ("local optimization"). For example, there can be a scenario in which the cost of implementing a management action exceeds the risk. In such a case, the risk can be accepted while prescribing breach verification and response actions to minimize the risk in the event an incident takes place. Moreover, the ROI mindset can be applied in prioritizing which vulnerability, threat, or risk-driving parameter to address first, based on their contributions to the overall device risk score ("local optimization"). Further, the ROI mindset can also be applied in selecting and prioritizing the most impactful management actions considering the available pool of all potential management actions for all vulnerabilities, threats and risk-driving parameters ("global optimization"). The process also includes storing successful security controls associated with each device and vulnerability in a database. These can be treated as best practices (or "knowledge modules") and shared across multiple entities during the management action assignment (i.e. definition, prescription, or selection) phase within the risk mitigation/remediation process 110.

In various embodiments, the device risk mitigation or remediation process 110 requires at least one management decision regarding what, if any, actions to take for risk management. Both the management decisions and associated work activities can require engagement from multiple stakeholders in an entity based on the required expertise, as well as assigned roles and responsibilities. Examples of risk mitigation/remediation-related decisions include requiring specific cybersecurity training for select users, data encryption, workflow addition or modification, etc. In the example requiring training for the select users, while an operations or information technology leader may decide whether to further train the users, the actual training can be conducted by an outside consultant and the session can be coordinated by a human resources person. In this regard, human factor conditions 108 impacting the quality of mitigation/remediation decisions and the associated work activities can also contribute to the asset vulnerabilities 106. Hence, aspects herein also include maintaining profiles of the individuals who would make vulnerability or risk management-related decisions and carry out activities, including decisions and work activities associated with incident responses.

According to certain aspects herein, the process 100 involves tracking vulnerabilities and risks, and all risk management decisions and activities over time. The process also includes generating dashboards for active oversight 112 of the risk management processes. The dashboards can include information such as a risk score for each device, the device risk score trends over time, quality of the risk postures leading to the device risk scores, overall organizational risk from all devices, organizational risk trend, status of vulnerability or risk management activities, cycle-time for risk mitigation/remediation activities, resource constraints in the risk management processes, combinations thereof, etc. for governance. The active oversight 112 and feedback 114 can ensure the desired level of quality control in the device risk posture development 102 and the risk mitigation/remediation 110 processes by ensuring the activities are performed according to the standard established by the entity.

Moreover, the process involves monitoring networks, analyzing network traffic, and direct or indirect observation of devices, processes, and people behaviors to detect signs of malicious activities. The process also involves actively, or periodically, checking all identified devices in an entity's infrastructure (e.g. physical involving buildings, plants, etc., or virtual involving internal and external network connections, etc., leading to at least some level of liability for the entity) against the valid inventory of the entity's devices. The intrusion detection system 116 can create alerts upon discovering any signs of intrusion, or foreign devices, and trigger the incident response process 118. The alerts can be generated using network technologies and crowdsourcing methods (also see reference number 530 and 532 in FIG. 5). The crowdsourcing methods are discussed in greater detail herein.

Additionally, the process includes initiating a defined breach verification process upon receiving an alert of potential malicious activity. Upon confirmation of a breach, the incident response process 118 follows the defined response mechanism identified for the device and/or vulnerability. Incident response actions ("what"), task assignments to stakeholders ("who") based on their expertise and/or roles and responsibilities, and associated work activities ("how") can be prescribed during the risk mitigation/remediation process 110 for each device and/or vulnerability as soon as a vulnerability associated with a device is identified. Potential incident responses can also be standardized according to the entity's policy with regards to "what", by "whom", and "how" to be executed during the response phase 118.

Furthermore, the process also involves storing successful incident responses 118 associated with each incident, device, vulnerability, root-cause condition, etc. in a database. These can be treated as best practices (or "knowledge modules") and shared during the potential incident response mechanism assignment (i.e. definition, prescription, or selection) phase within the risk mitigation/remediation process 110.

Device Cyber-risk Profile/Posture Composition

Figure 2:
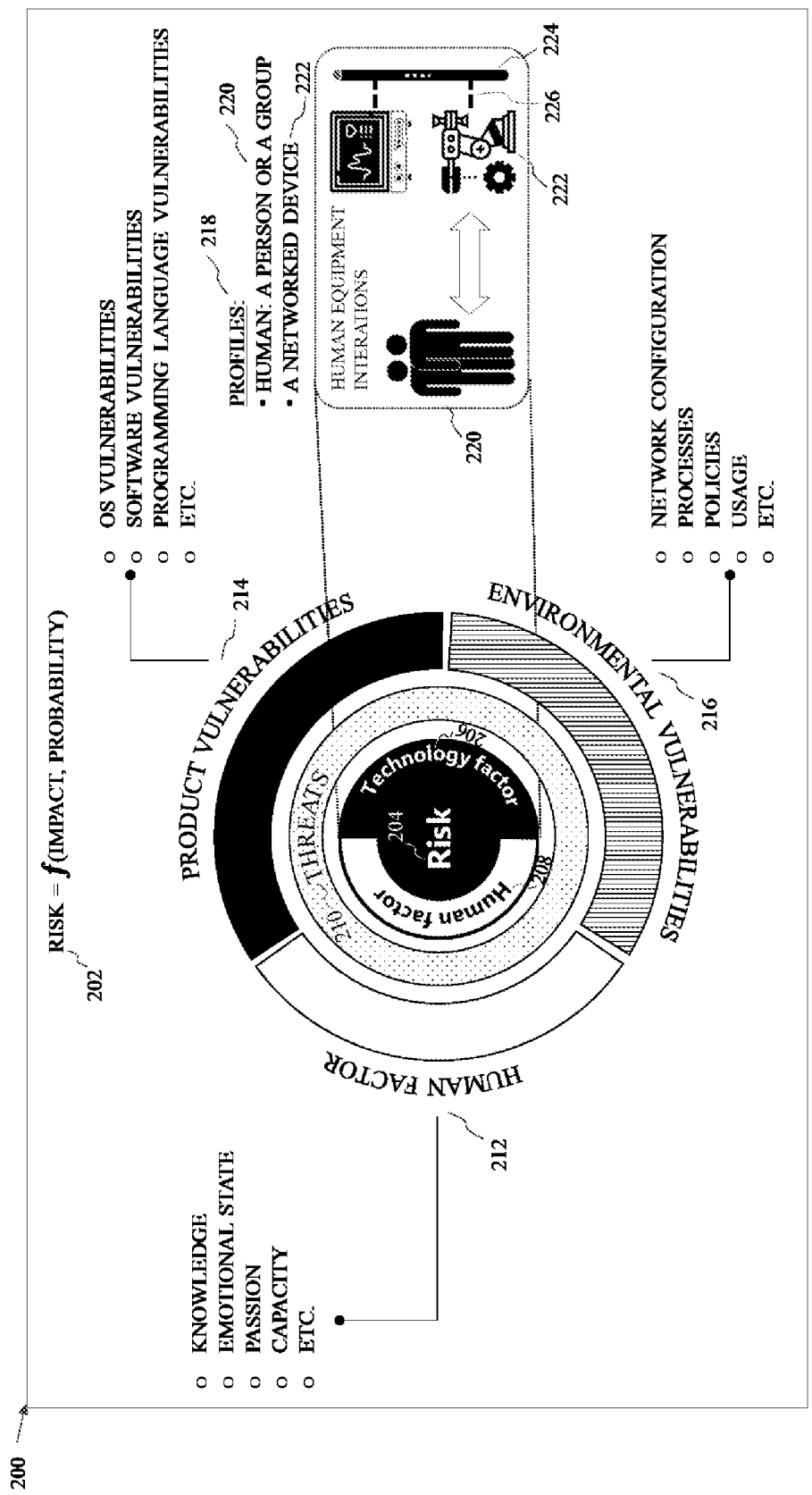
FIG. 2 illustrates the composition of a device cyber-risk profile/posture according to aspects of the present disclosure.

Now, FIG. 2 illustrates an example of a device cyber-risk posture 200 (also see reference numbers 102 and 106 in FIG. 1) composition and its key elements according to various embodiments of the present disclosure. Risk 202 is defined as a function of probability and impact. The probability is the likelihood of a cyber-attack occurring and the impact is the consequence of a cyber-attack exploiting a vulnerability. In this regard, risk posture 200 of a device 222 can include criticality of the device 222, the network 224 that includes the device 222, and other devices that the network 224 includes. The criticality can refer to the potential negative consequences that an entity would face from a breach involving one or more devices and/or the connecting network. The risk posture 200 also includes asset 222 vulnerabilities and threats 210 indicating the likelihood of a cyber-attack occurring.

According to various aspects of the present disclosure, the asset 222 vulnerabilities include product vulnerabilities 214, environment-related vulnerabilities 216, and human-factor-related vulnerabilities 212.

Product vulnerabilities 214 can include, for example, operating system (OS) vulnerabilities, software vulnerabilities, programming-language-level vulnerabilities, etc.

Environment-related vulnerabilities 216 can include, for example, network 224 configuration (e.g. segmented network with VLAN vs. flat open network, etc.), security of network connections 226 (e.g. encrypted data, etc.), unused open USB ports, weak passwords to access the asset 222, organizational processes and policies, etc. The level of the asset 222 usage can indicate the criticality of the asset 222 in the overall risk posture 200.

Human-factor-related vulnerabilities 212 require creating and managing profiles 220 of all individuals directly or indirectly affecting the asset 222. The individuals affecting the asset 222 can include at least one operator, configurer, life cycle manager of the asset 222, designer and maintainer of the network 224, individual expected to make decisions and/or perform risk mitigation/remediation activities and respond to an incident should one take place, combinations thereof, etc. The human-factor-related vulnerabilities 212 can include, for example, insufficient knowledge, a non-optimal emotional state, an overload of work activities, a lack of passion for work, poor work engagement, etc.

According to various aspects herein, the process includes incorporating threats 210 in addition to vulnerabilities in the asset 222 risk posture development. The threats 210 can include product, environment-related, and human factor considerations. In this regard, human factor 208 considerations in deriving risk 204 level can include vulnerabilities 212 and human-factor-related threats 210. Similarly, technology-factor 206 considerations in deriving risk 204 can include product vulnerabilities 214, environment-related vulnerabilities 216, and other non-human-factor-related threats 210.

Further, the process involves creating and maintaining two types of profiles 218: (i) the networked device risk profile 222 and (ii) profile(s) of individual(s) 220 to include potential human-factor-related vulnerabilities. The overall risk posture 200 can blend human factor conditions with environment-related vulnerabilities to derive composite and/or elevated risk. For example, a device can have a default factory username and password that is not required to be changed by a user upon initial log-in. If users had insufficient knowledge of cybersecurity risk arising from keeping the default username and password, the entity might continue to use the asset with the factory username and password, and these log-in credentials may be widely known. In this situation, overall risk is elevated considering the environment-related vulnerability (i.e. log-in credentials aren't required to be changed upon initial log-in to use the asset) coupled with insufficient user knowledge (i.e. human factor).

Role/Skill-Based Decisions and Work Activities in Risk Management

Figure 3:
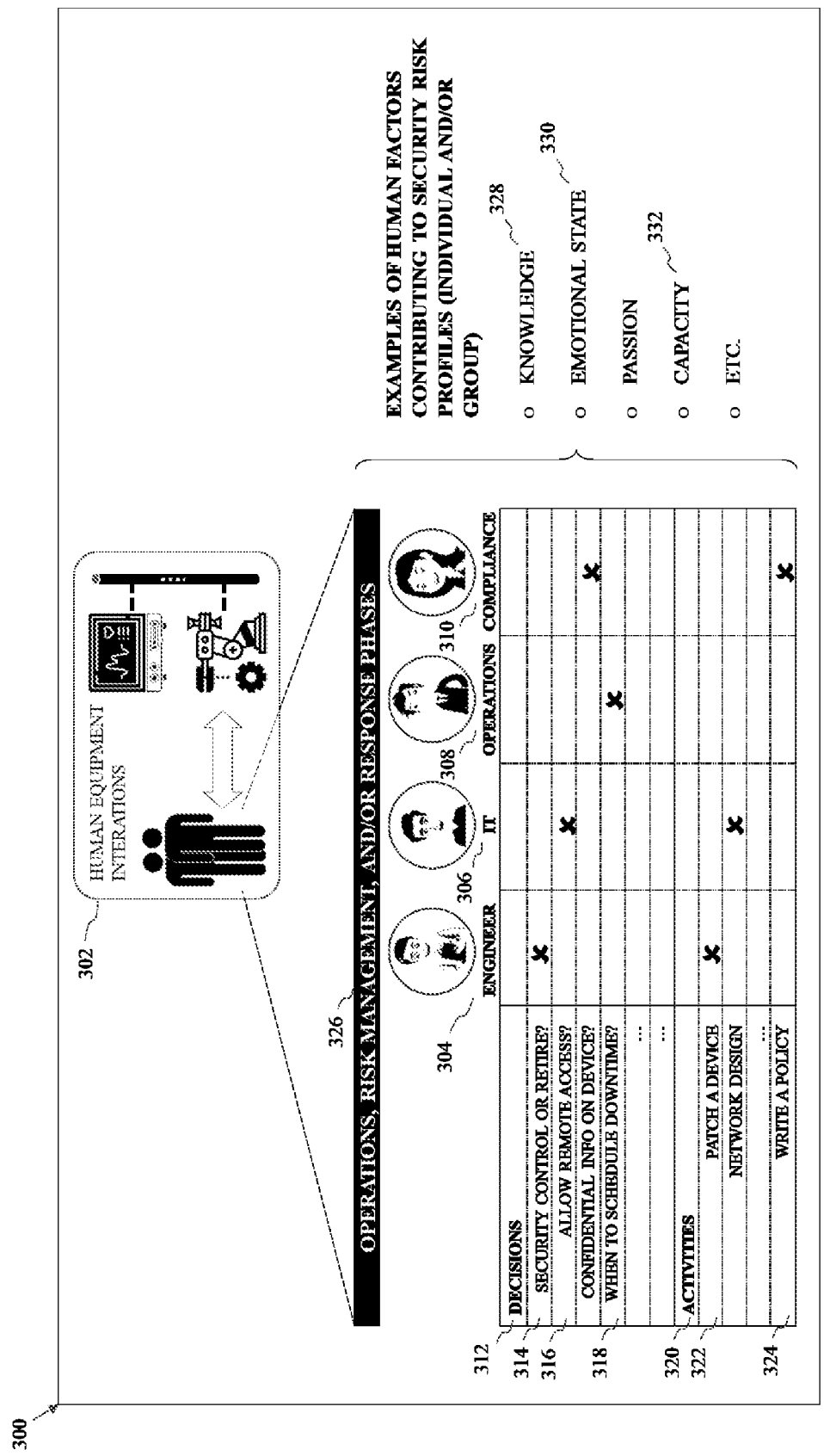
FIG. 3 illustrates an example of role-based and/or skill-based decision authorities and work responsibilities during the cyber-risk remediation/mitigation, and/or the cyber-incident response phases according to various aspects of the present disclosure.

Now referring to FIG. 3, a process 300 for role-based and/or skill-based decision authority and work responsibility assignment during the risk mitigation/remediation and/or the incident response phases is disclosed. FIG. 3 illustrates the process 300 via an example. The human-asset interaction 302 includes all individuals who directly or indirectly affect the asset (i.e. directly operate or influence operation of the asset under different workflows, or are involved in decision making or performing work activities during the risk mitigation, remediation, or response phases, etc.). The human-asset interactions 302 can happen in the operations, risk management, and/or incident response phases 326 in addition to the life cycle management phase.

In the representative example, certain decision 312 authorities are assigned to personnel from different departments such as engineering 304, information technology (IT) 306, operations 308, compliance 310, etc. in an entity. The delegation of decision 312 making authority can be based on expertise and/or pre-defined roles. An entity can also choose to assign decision 312 making authorities and/or work activities 320 to the best-skilled individuals available in their respective domains based on the criticality of the decisions/work activities. These individuals can be employees of the entity or external parties (e.g. consultants, contractors, etc.).

Device vulnerability mitigation/remediation actions can be broad in nature. For example, an entity can assign (i.e. role based) or find an engineering team member to be better suited (i.e. skilled based) to decide 314 if it is better to implement a security control associated with a vulnerability or retire the concerning asset based on trade-offs involving cost, risk, expected effectiveness of the security control, etc. Similarly, an IT team member can be found better suited to decide 316 whether remote access to an asset should be allowed. If an engineer 304 decided 314 to implement a security control, an operations person 308 could be in a better position to decide 318 when to schedule operational downtime for the security control implementation.

Similarly, various activities associated with risk management can be performed by personnel from different departments based on their roles or skill levels. For example, an activity 322 involving application of a software patch to an asset can be performed by an engineer 304. A compliance 310 team member can be better suited to write a new organizational policy 324.

In this regard, process 300 can involve multiple stakeholders based on their expertise and/or roles to make decisions or perform work activities in the risk mitigation/remediation and incident response phases. The stakeholders can be internal or external parties.

As highlighted in preceding sections, certain embodiments herein include creating profiles of stakeholders involved in the risk mitigation/remediation and potential incident response activities. The profiles can include human-factor-related conditions such as knowledge 328, emotional state 330, capacity 332, etc. that can also contribute to the device security risk.

Device Cyber-Risk Profile Construction

Figure 4:
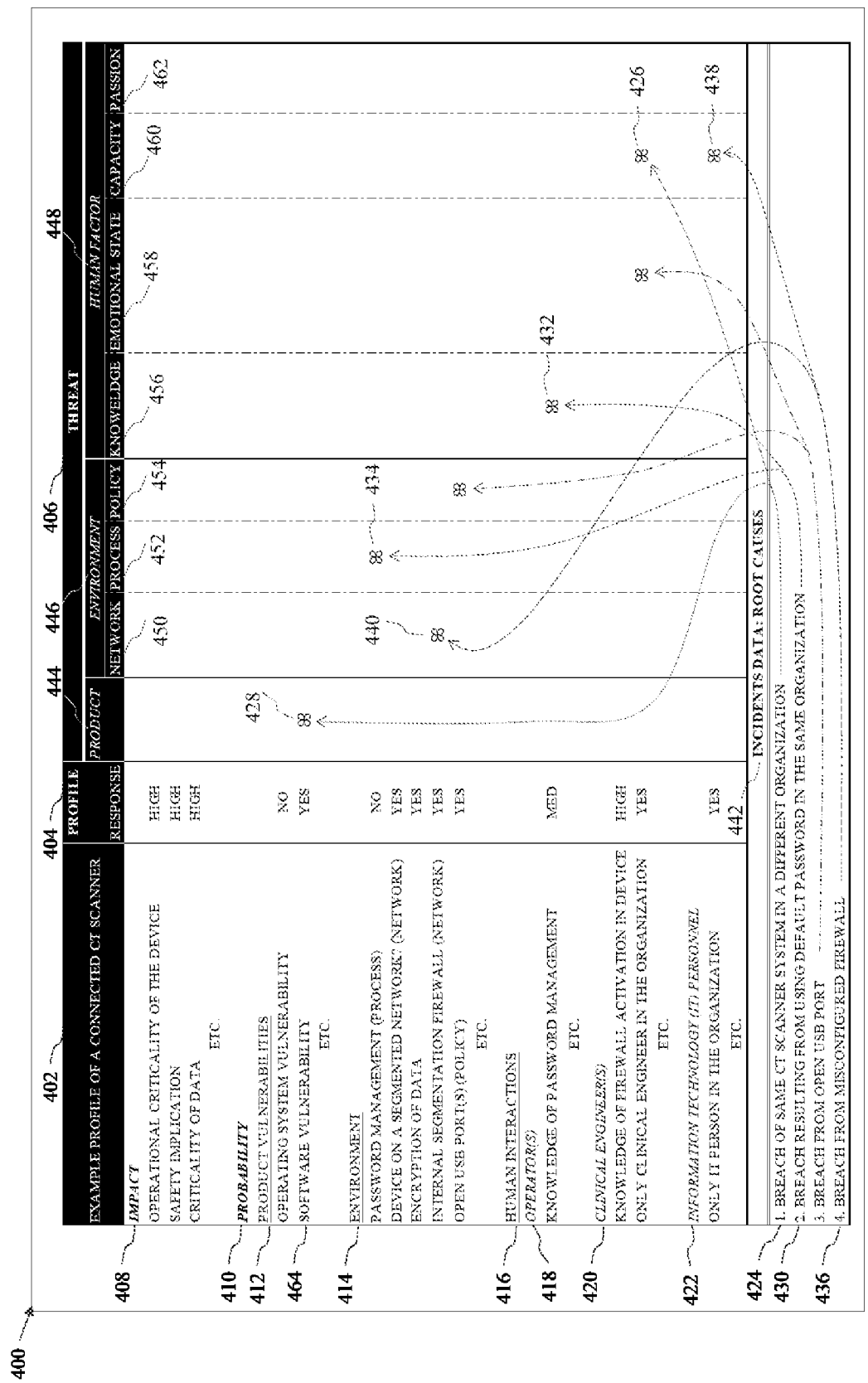
FIG. 4 illustrates an example of a device cyber-risk profile and its construction according to aspects of the present disclosure.

Referring now to FIG. 4, a process 400 for constructing a device cybersecurity risk profile is disclosed according to various aspects of the present disclosure. FIG. 4 illustrates the process 400 via an example of a network-connected CT scanner 402 for clarity of discussion. As illustrated in the example, the process 400 includes identifying parameters that indicate the probability 410 of cyber-attacks and associated impact 408 for the risk profile. Parameters such as criticality of having the CT scanner available for patient care, patient safety implications from malfunctioning of the CT scanner, legal and regulatory liabilities from patient data breach, etc. indicate potential impacts from a cyber-attack involving the CT scanner in the example. The product vulnerabilities 412, environmental-condition-induced vulnerabilities 414, and human interactions 416 related vulnerabilities can indicate the probability 410 of cyber-attacks. Furthermore, various human factors such as knowledge, capacity, emotional state, etc. involving operator(s) of the CT scanner 418, clinical engineer(s) 420, IT personnel 422, etc. contribute to human interactions 416 related vulnerabilities. The device risk profile can also contain information that leads to identification of parameters and parameter values that define cybersecurity risk characteristics of a device. For example, a device risk profile can contain information such as the type of operating system used in the CT scanner; the identification of the operating system leads to the parameter value response indicating if security vulnerabilities associated with the operating system exist.

Further, the process 400 includes incorporating threat indicators 406 (also see reference number 210 in FIG. 2) and mapping them into at least three categories: (i) product 444, (ii) environment-related 446, and (iii) human factors 448. The environmental-condition-centric threat indicators are further divided into network 450, process 452 and policy 454 subcategories in the given example. Similarly, human-factor-related threats are divided into knowledge 456, emotional state 458, capacity 460, and passion 462 subcategories for clarity of discussion and for convenience of illustration in the example implementation.

Moreover, the process 400 involves determining values (or "responses") 404 as referred in the FIG. 4) for all profile parameters according to aspects of the present disclosure herein. The responses can be qualitative or measurable (e.g. deterministic, quantitative, etc.). The process further includes actively or periodically accessing previous incident root-cause data 442 (also see reference numbers 122 and 120 in FIG. 1) from at least one entity to identify relevant threat indicators for updating the device risk profile.

For instance, in the example implementation, accessing the incident root-cause data 442 identified a recent breach 424 that exploited a software vulnerability in the same CT scanner (i.e. same make and model) installed in a different organization where the organization had not applied the necessary software patch. The device profile parameter response 466 under software vulnerability 464 indicates that the vulnerability under consideration exists, requiring a software patch. The device parameter response 470 under the human interactions 416 section indicates human-capacity-related vulnerability because there is only one clinical engineer in the organization 468 who can apply the required software patch and s/he is likely overloaded with many other work priorities. In this regard, threat indicators can be marked under product 428 and capacity 426 (i.e. human factor) threats in the device risk profile. Similarly, the device risk profile indicates a lack of password management process for this CT scanner, and the operator has limited knowledge about the importance of password management with respect to cybersecurity. The incident root-cause data 442 revealed a recent breach 430 resulting from exploitation of the factory-set default password. Hence, threat indicators can be marked under process 434 and knowledge 432 (i.e. human factor) threats subcategories in the device risk profile. Further, according to the device risk profile, the CT scanner is connected to a segmented network having a segmentation firewall. The organization has only one IT person to address a variety of IT matters, raising concerns about his/her capacity to address matters in a timely fashion. Accessing the incident root-cause data 442 identified a recent breach 436 resulting from a misconfigured firewall. In this regard, a threat of having a misconfigured firewall exists, requiring addition of threat indicators under network 440 and capacity 438 (i.e. human-factor).

According to various aspects herein, the process also involves computing a risk score based on the values (or "responses" 404 as referred in the FIG. 4) of the parameters and the threat indicators included in the device risk profile using an algorithm. Depending on the situation, application, and availability of resources, the risk score can be derived by (i) simply taking a weighted average of all parameter and threat indicator values indicating probability of a cyber-attack and multiplying that with the weighted average of parameter values indicating potential impact, where numerical values can be assigned to qualitative scales (e.g. "3", "5", and "9" to "low", "medium", and "high" respectively) for each parameter response and threat indicator, (ii) using the Qualify Function Deployment (QFD) or similar methods, (iii) using an advanced algorithm with mixed methods (combining qualitative and quantitative techniques), or (iii) combinations thereof. In some instances, depending on the chosen method, different weightings can be applied for each parameter and threat indicator values in computing the device risk scores to account for any special considerations relating to application, entity, industry, combinations thereof, etc.

Moreover, the process involves actively monitoring the parameter values 404 (also see reference numbers 134 and 108 in FIG. 1) and threat indicators 406 with changing conditions to keep the risk profile current. The risk score can change over time accordingly.

Risk Profile Information and Intrusion Alerts Capture

Figure 5:
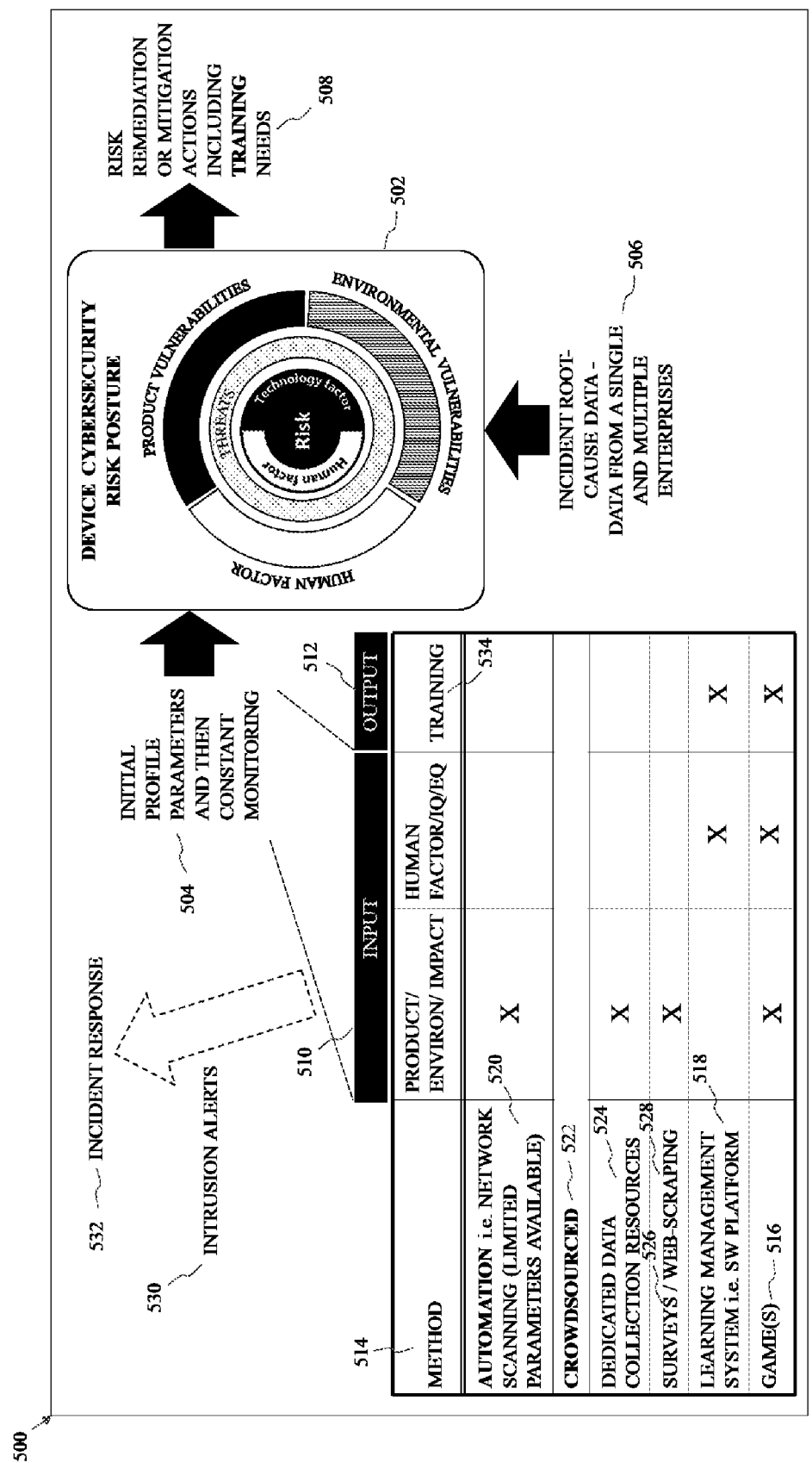
FIG. 5 illustrates methods of collecting device risk profile parameter values to construct and maintain profiles, and intrusion alerts according to various aspects of the present disclosure.

Now referring to FIG. 5, a method 500 for capturing device risk profile parameter values 504 (also see reference numbers 134 and 108 in FIG. 1) and intrusion alerts 530 is disclosed. Active, or at least periodic, collection of parameter values 504 along with incident root-cause data 506 keeps the device cybersecurity risk posture 502 current. Key inputs 510 to the profile include values for product, environment-related and human-factor-related information and vulnerabilities as well as potential impact of a cyber-attack involving the device. The broader the set of parameters including a variety of vulnerabilities, threats, and impact indicators in the device risk profile, the better the risk posture 502 will be. In this regard, the process 500 involves using one or more methods 514 to gather values for these broad sets of parameters. Similarly, key inputs 510 to the incident response mechanism 532 include intrusion related alerts 530 generated by using a variety of methods 514.

Various network technologies 520 such as active/passive network scanning, deep packet inspection of network data flow, etc. can deliver certain parameter values such as Host Name, communicating MAC addresses, free network ports, primary IP address, device type and application (directly or through analytics), network topology, etc. They, however, may not always deliver certain parameter values such as firmware, firmware versions, all asset software, software versions, whether the device contains confidential data, etc. They also may not deliver human-factor-related conditions. In this regard, other crowdsourcing 522 methods can be used as supplements and/or replacements. Similarly, the network technologies 520 can also detect anomalies in network data flow, device behaviors, etc. to detect potential malicious activities. They, however, may not detect some of the human-factor-related breaches. For example, network technologies 520 may not be able to detect if someone is manually copying (i.e. stealing) confidential information from a device; crowdsourcing methods 522 can be more effective in creating intrusion alerts in such scenarios.

Crowdsourcing methods 522 for capturing risk parameter values can include the use of dedicated data collection resources 524, periodic surveys 526 to select individuals, web-scraping 528, a learning management system 518, and special purpose games 516 and/or gamification. While dedicating data collection resources 524 such as contractors or employees of the entity can be proven costly in some cases, they can deliver all but the human-factor-related parameters. Similarly, relevant individuals can periodically be surveyed 526 to capture most of the parameter values except for the human-factor-related conditions if the required level of participation from these individuals is assured. Moreover, web-scraping 528 various data sources including catalogs can deliver certain product level information. A learning management system 518 can effectively assess knowledge related human factor vulnerabilities. When knowledge deficiency is found (i.e. vulnerability), the system can also deliver relevant training 534 as a risk remediation/mitigation measure 508.

Further, a special purpose gaming application 516 with at least one game mode, gamification, or a combination thereof can be used to capture device risk profile parameter values according to various aspects of the present disclosure. A gaming application 516 (available on web, mobile, etc.) with optimized game modes (or gamification) for the given environment, potential users, entity, industry, combinations thereof, etc. can allow (i) better user engagement, (ii) optimized cost by utilizing downtime of experts who are otherwise engaged in other activities, and (iii) capture of all required information and parameter values directly or via analytics with a high level of confidence. Certain game modes can not only effectively assess human factor vulnerabilities related to specific knowledge gaps, but also can deliver the relevant training 534 as a risk remediation or mitigation measure 508 to the relevant individuals. Moreover, crowdsourcing via gamification 516 can be effective in creating intrusion alerts involving scenarios such as theft, identification of device misbehaviors or malfunction, etc. For example, an individual observing a suspicious or malicious activity can enter it into a gaming application for validation and associated reward. In such a case, a breach verification process can be initiated upon receiving an alert of malicious activity from the gaming application, followed by initiation of an incident response process (also see reference number 118 in FIG. 1) upon successful verification of the breach. Intrusion detection via web-scraping 528 can also take place, for example, when confidential data involving a specific device or an announcement of a breach is placed in the public domain (i.e. World-Wide-Web) by bad actors.

In this regard, the process 500 includes using at least one method to obtain risk profile parameter values to build and maintain some level of device cybersecurity risk posture 502, and to generate intrusion related alerts 530. It also can allow selection of the most cost-efficient method or a combination of methods, to achieve the desired level of visibility to an entity's risk.

Game/Game-Based Application Development

Figure 6:
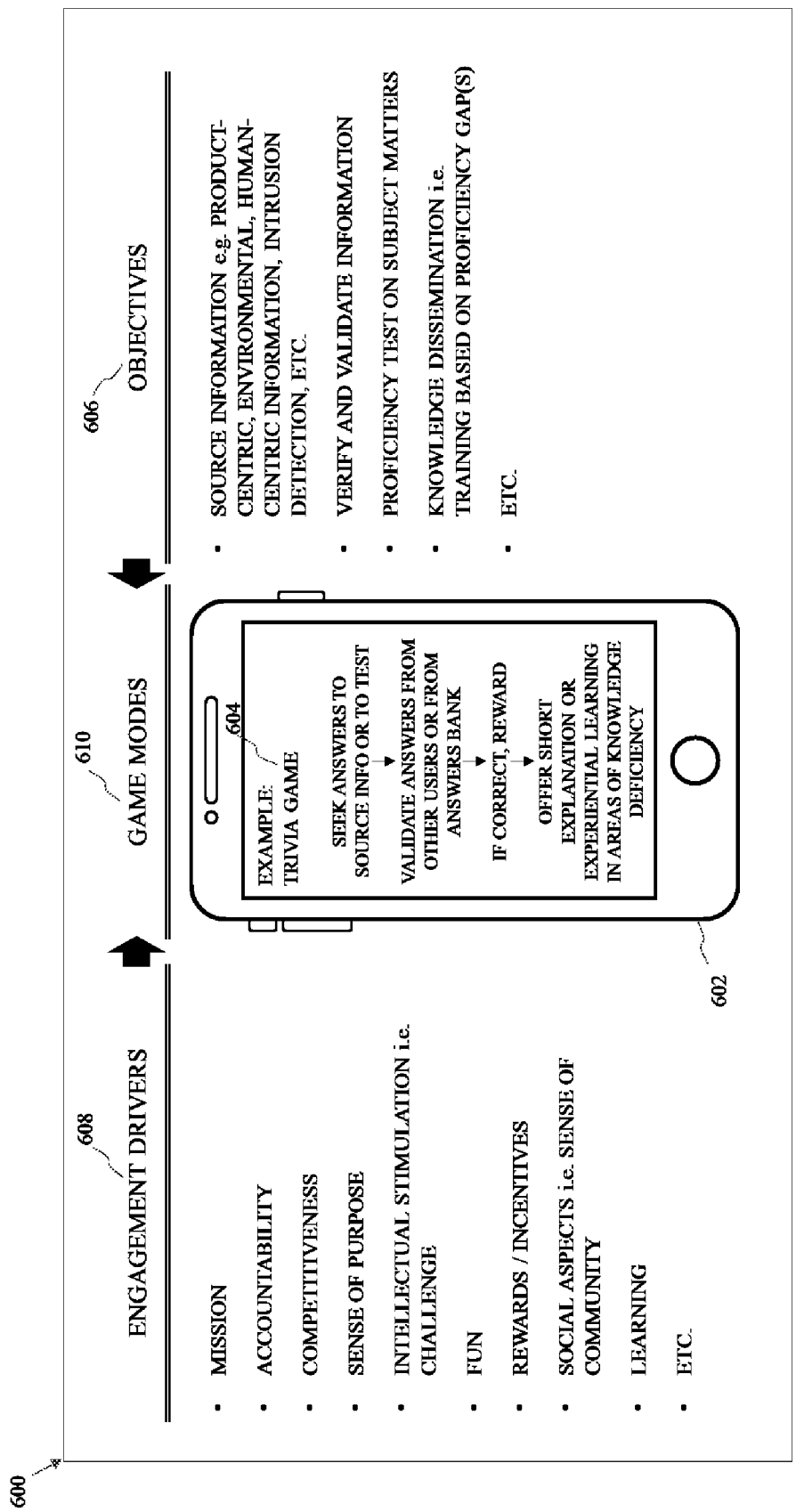
FIG. 6 illustrates a method of developing game-based application and relevant gaming modes according to aspects herein.

Now to FIG. 6, a process 600 for developing a game (also see reference 516 in FIG. 5), game-based application, gamification for crowdsourcing, or combinations thereof (all referred as "game" herein for simplicity of discussion) is disclosed according to various aspects herein. The objectives 606 behind developing a game can include solicitation of information (e.g. device risk profile parameter values, intrusion detection, etc.) for the risk posture, verification and validation of information, assessment of human factor conditions including subject matter proficiency, dissemination of knowledge (e.g. training), combinations thereof, etc. The game can be available on a computing platform (e.g. computer, tablet, mobile 602, etc.) and hosted on a device, cloud, or a combination thereof. The process also involves recording all user and process activities.

According to aspects herein, the process 600 includes identifying motivation and engagement drivers 608 for keeping the targeted individuals engaged in playing the game actively, or at least regularly, for accomplishing the set objectives 606. Examples of the user motivation and engagement drivers 608 include allegiance to the mission, sense of accountability towards what is proposed, rewards and incentives, competitiveness if offered through aspects of a game, sense of achievement if a game offered intellectual challenge, enjoyment, learning if such aspects are included, sense of community if a game involved interactions with others, etc. Selection of the user engagement drivers 608 for game development can depend on the culture of an entity, personalities of individuals, policies of an entity, industry, etc. For example, a policy of an organization may preclude individuals from playing a game while at work; however, the individuals may not only be allowed, but also encouraged, to play a game if the game included in-service training elements.

Further, the process includes developing at least one game mode 610 within the game that can motivate and engage targeted users to accomplish at least one objective 606 of the game. A game mode 610 is defined herein as a distinct configuration that varies gameplay and affects how other game mechanics behave. In this regard, a game with several game modes can present different settings and features in each one, changing how a particular element of the game is played. For example, a multiplayer game mode, as opposed to a single player game mode, can require further coordination, cooperation, and/or competitiveness. Gameplay is the specific way in which players interact with a game. Game mechanics are the basic actions, processes, visuals, and control mechanism. They are, for example, the rules and rewards that make up gameplay and create an engaging experience. In this regard, a survey can serve as one of the simplest forms of a game or a game mode where players/users are motivated to participate and periodically engage because such participating in the surveys can be included in their job responsibilities. Gameplay and game mechanics can add to the user experience in this example.

For example, a trivia game 604 can have multiple types of trivia quizzes that can solicit information, verify and validate information, test knowledge proficiency, and/or assess various human factor conditions. Offering multiple game modes can allow engagement from a variety of targeted users. The same information can also be solicited in multiple game modes, in multiple manners, and from multiple users, to ensure a high accuracy level for information gathered. In the example implementation of a trivia game 604, the objectives 606 may be addressed via the following steps:

- A trivia game mode seeks answers to pre-defined questions from users to source information or to test knowledge.
- Each user's answers are recorded and stored in the game.
- Answers from other users, including one or more designated experts (e.g. based on users' profiles, validated roles & responsibilities, credentials, etc.) playing the same or different game modes, and/or from an answer bank, can be used to validate the answers.
- If the answers are correct, appropriate reward is offered.
- If knowledge deficiency is identified (i.e. via back-end analytics) on a topic, a short explanation or experiential learning is offered in an engaging manner.

The game-modes 610 can also include multiple scenarios to assess a user's (i.e. player's) passion, interests, and skills. This information, when compared with the user's current role, can serve as at least one of the indicators for determining the likelihood of making an error in a given work activity. Similarly, elements of the Guilford Zimmerman Temperament Survey (GZTS) types of mood surveys can be used to assess the mood of a user. Analytics involving information such as game playing pattern, frequency, performance, duration, etc., potentially in combination with other indicators, can be used to assess capacity (i.e. workload) of a user. Combined information such as passion, interests, skills, mood, capacity, etc. can indicate an individual's drive for the given scope of engagement. In this regard, games can be utilized to gather various human factor conditions for the device cybersecurity risk profiles.

Moreover, the process includes performing behavioral analytics based on recorded user activities to identify further human-factor-related vulnerabilities. The process also involves developing and including new game modes 610 periodically in the game to ensure an appropriate level of user engagement for meeting the objectives 606.

Use of Game/Gaming in Risk Management

Figure 7:
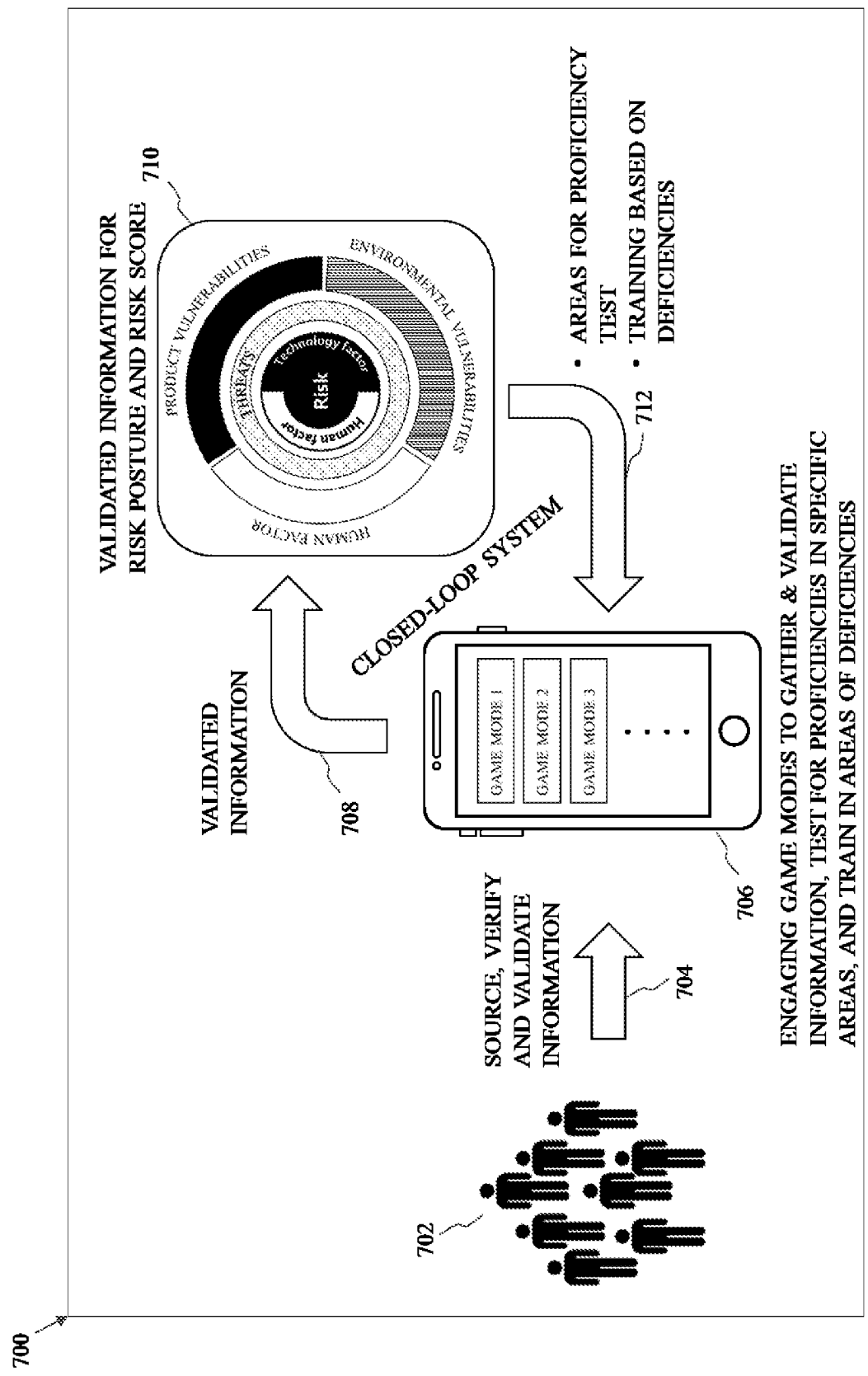
FIG. 7 illustrates a process and closed loop system for engaging users to collect and validate select information, test for knowledge, and train using a gaming application according to various aspects of the present disclosure.

Referring now to FIG. 7, a process 700 for engaging targeted users to collect and validate select information, to test for knowledge proficiency, and to train users using at least one gaming application (also see reference 516 in FIG. 5) is disclosed according to various aspects of the present disclosure. The process involves identifying individuals 702 who directly or indirectly affect the asset (also see reference 302 and 326 in FIG. 3, as well as reference 220 in FIG. 2) to engage in sourcing and validating information 704.

Further, the process includes providing the targeted individuals 702 access to the game 706 with at least one game mode optimized to ensure an appropriate level of user engagement. Crowdsourcing using the game 706 can allow periodic, if not active, solicitation of all device risk profile parameter values with high accuracy. The process 700 also involves recording validated information 708 into the device risk profile to keep the risk posture 710 and risk score current. A device application and location can also be solicitated using the game-based crowdsourcing method.

When knowledge deficiency is found in the device cybersecurity risk profile, relevant training 712 as a risk remediation/mitigation measure (also see reference 508 in FIG. 5) to the relevant individuals can be delivered through the game 706. For example, the reference 432 in FIG. 4 indicates both vulnerability and threat with respect to password management knowledge. In this case, a short training on how password-related cyber breaches take place and how best to manage the risk can be delivered through a game mode to the CT scanner operator.

MISCELLANEOUS

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects. Furthermore, aspects of the present disclosure may take the form of a computer program product embodied in one or more computer readable storage medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, a portable computer diskette, a hard disk, a random access memory (RAM), a read-only memory (ROM), an erasable programmable read-only memory (EPROM), flash memory, a portable compact disc read-only memory (CD-ROM), an optical storage device, a magnetic storage device, or any suitable combination thereof. In the context of this document, a computer readable storage medium may be any tangible medium that can contain, or store a program for use by, or in connection with, an instruction execution system, apparatus, or device. A computer storage medium is not a transient propagating signal, as such.

A computer readable signal medium may include a propagated data signal with computer readable program code embodied therein, for example, in baseband or as part of a carrier wave. A computer readable signal medium is not a computer readable storage medium.

Computer program code for carrying out operations for aspects of the present disclosure may be written in any combination of one or more programming languages. The program code may execute entirely on the user's computer, partly on the user's computer, as a stand-alone software package, partly on the user's computer and partly on a remote computer, or entirely on the remote computer or server.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes and systems for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be apparent to one with skills in the art that the device cybersecurity risk management process and system of the invention may be provided using some or all of the mentioned features and components without departing from the spirit and scope of the present invention. It will also be apparent to the skilled artisan that the embodiments described above are specific examples of a single broader invention which may have greater scope than any singular description taught. There may be many alternations made in the descriptions without departing from the spirit of the present invention.

What is claimed is:

1. A computer implemented process for managing cybersecurity of an electronic device associated with a network of plurality of devices of an entity, the process comprising:
    identifying identity of the device using one or more device specific static parameters, the device being any or a combination of an operational technology (OT) device, an internet of things (IoT) device, and a device directly connected to any or a combination of one or more OT and IoT devices associated with the entity;
    creating a device profile associated with the device, the device profile including one or more parameters indicating one or more vulnerabilities, one or more threats and specific operating environment of the device, wherein
    the device profile includes at least one parameter that uniquely identifies the device, at least one parameter indicating criticality of the device in the specific operating environment, and any or a combination of at least one threat indicator, at least one human-factor condition indicating parameter, at least one the device's bill-of-material related parameter, and at least one operating environment related dynamic parameter;
    validating any or a combination of the one or more vulnerabilities and the one or more threats identified based on values of the one or more parameters;
    generating a remediation or mitigation plan for each of the validated one or more vulnerabilities and one or more threats associated with the device, wherein
    the remediation or mitigation plan includes at least one of implementing a security control, assigning a breach verification process, and assigning an incident response workflow to be executed in an event of an attack or breach;
    receiving a plurality of user profiles of individuals associated with the entity, wherein each of the plurality of user profiles at least includes skills, role, authority, and capacity related information of an individual;
    generating a device cybersecurity plan based on the remediation or mitigation plan for the each of the one or more vulnerabilities and the one or more threats, the device profile, and the plurality of user profiles, wherein the device cybersecurity plan is executed in response to a trigger;
    updating implementation status in response to execution of the device cyber security plan; and
    updating values of the one or more parameters in the device profile associated with the device based on the implementation status.

2. The process of claim 1, wherein the human-factor conditions comprising any or a combination of:
    user defined human-factor and cognitive psychological conditions, skills in user defined topics and tasks, and capacity to perform user identified tasks.

3. The process of claim 1, wherein creating the device profile is based on obtaining device profile information using at least one crowdsourcing method based on any or a combination of surveys, web-scraping, games and gamification.

4. The computer-implemented process of claim 1 further comprising:
computing at least one of following:
a risk score for each of the plurality of devices associated with the entity based on the one or more parameters and their respective values in the device risk profile; and
a relative risk contribution of each of the one or more parameters to the overall device risk score for each of the plurality of devices, wherein the overall device risk score is computed based on the parameters included in the device profile; and
generating the trigger for initiating execution of the device cybersecurity plan based on a priority order for one or more remediation or mitigation activities using at least one of the following mechanisms:
assigning the priority order to each of the plurality of devices associated with the entity based on the respective risk scores; and
assigning the priority order to each of the one or more vulnerabilities and one or more threats associated with the plurality of devices associated with the entity based on the relative risk contribution of each vulnerability or each threat.

5. The computer implemented process of claim 1, wherein the process comprises:
receiving an alert indicating a potential breach involving the device from any or a combination of network intrusion detection system and crowdsourcing method;
accessing a first data source having a collection of breach verification processes associated with the one or more vulnerabilities and a second data source having a collection of incident response processes associated with the one or more vulnerabilities;
in response to the alert, identifying one or more breach verification processes and corresponding one or more incident response processes associated with the device;
receiving the plurality of user profiles;
generating a breach verification and incident response plan based on the identified one or more breach verification processes, the one or more incident response processes, and the plurality of user profiles;
executing the one or more breach verification processes based on the breach verification and incident response plan;
upon successful verification of a breach, executing the incident response processes corresponding to the breach based on the breach verification and incident response plan; and
updating the implementation status in response to execution of the breach verification and incident response plan.

6. The process of claim 3 further comprising:
obtaining the device profile information periodically or upon a change in any one of the parameter values; and
updating the device profile with new information.

7. The process of claim 1, wherein assigning the breach verification process comprises:
generating one or more applicable breach verification process options for each vulnerability or each threat using at least one of following:
accessing a data source, the data source having a collection of breach verification processes for different vulnerabilities and threats; and
new user-defined one or more breach verification processes based on the specific operating environment; and
creating a breach verification process plan for each vulnerability or each threat associated with the device operating in the specific environment based on the one or more applicable breach verification process options and their respective implementation costs.

8. The process of claim 1, wherein identifying identity of the device is based on using at least one crowdsourcing method based on any or a combination of surveys, web-scraping, games and gamification.

9. The process of claim 1, wherein assigning the security control for implementation comprises:
generating one or more applicable security control options for each vulnerability or each threat using at least one of following:
accessing a data source, the data source having a collection of security controls; and
new user-defined one or more security controls based on the device's operating environment; and
selecting at least one security control for the each vulnerability or threat based on effectiveness and implementation cost of the each one or more security controls in the specific operating environment.

10. The process of claim 5, wherein the process includes detecting at least one sign of malicious activity associated with the entity using at least one crowdsourcing method.

11. The process of claim 5 further comprising:
performing postmortem analysis after the each; breach to identify at least one root-cause condition leading to the breach;
generating the one or more threat indicators based on the one or more root-cause conditions; and
storing the one or more root-cause conditions and the one or more threat indicators into at least one database.

12. The process of claim 1, wherein assigning the incident response comprises:
selecting at least one incident response option for each of the plurality of vulnerabilities based on effectiveness in environment and cost of implementation;
wherein the incident response options include at least one of:
new user-defined responses; and
incident responses for selection by accessing a data source having a collection of incident responses.

13. The computer implemented process of claim 1, wherein the process uses any or a combination of one or more games, one or more game-based applications, and gamification for risk management by:
identifying at least one application in at least one risk management component, wherein the risk management components include any or a combination of vulnerability assessment, risk assessment, risk remediation or mitigation, compromise detection, and incident response; and
using at least one game mode of at least one of games, game-based applications, or gamification for the identified at least one application.

14. The process of claim 13, wherein at least one application include any or a combination of crowdsourcing information, user supported validation of information, testing knowledge of one or more users, training delivery to one or more users, information dissemination, and behavioral analytics of individual users or one or more groups of users.

15. The process of claim 13, wherein development of at least one application for risk management comprises:

identifying at least one objective for developing any or a combination of the games, game-based applications, and gamification;

identifying target users of any or a combination of the games, game-based applications, and gamification;

identifying motivation and engagement drivers for the users to use any or a combination of the games, game-based applications, and gamification; and developing any or a combination of the games, game-based applications, and gamification with at least one game mode such that the target users are engaged in meeting the at least one objective.

16. A system for implementing device cybersecurity risk management comprising:
a processor implemented in a network connectable electronic device of an entity; and
a memory coupled to the processor
and comprising computer readable program code executable by the processor to perform:
identifying identity of the device using one or more device specific static parameters, the device being any or a combination of an operational technology (OT) device, an internet of things (IoT) device, and a device directly connected to any or a combination of one or more OT and IoT devices associated with the entity;
creating a device profile associated with the device, the device profile including one or more parameters indicating one or more vulnerabilities, one or more threats and specific operating environment of the device, wherein
the device profile includes at least one parameter that uniquely identifies the device, at least one parameter indicating criticality of the device in the specific operating environment, and any or a combination of at least one threat indicator, at least one human-factor condition indicating parameter, at least one the device's bill-of-material related parameter, and at least one operating environment related dynamic parameter;
validating any or a combination of the one or more vulnerabilities and the one or more threats identified based on values of the one or more parameters;
generating a remediation or mitigation plan for the each of the validated one or more vulnerabilities and one or more threats associated with the device,
wherein the remediation or mitigation plan includes at least one of implementing a security control, assigning a breach verification process, and assigning an incident response workflow to be executed in an event of an attack or breach;
receiving a plurality of user profiles of individuals associated with the entity, wherein each of the plurality of user profiles at least includes skill, role, authority, and capacity related information of an individual;
generating a device cybersecurity plan based on the remediation or mitigation plan for the each of the one or more vulnerabilities and the one or more threats, the device profile, and the plurality of user profiles, wherein the device cybersecurity plan is executed in response to a trigger;
updating implementation status in response to execution of the device cybersecurity plan; and
updating values of the one or parameters in the device profile associated with the device based on the implementation status.

17. The system of claim 16, wherein the processor is coupled to a "gaming" platform to:
engage at least one user in at least one game mode included in a game or gamified survey with at least one user reward mechanism for any or a combination of solicitating the device profile information, identifying the user's cognitive psychological condition, testing the user's skills, and validating information;
generate each user's profile via behavioral analytics performed based on the user's activities in the game and/or engagement in the gamified survey;
deliver pre-programed trainings in a gamified manner in areas where individual skill deficits are noticed for each user; and
disseminate information to all users in a gamified manner per the entity's needs.

18. The system of claim 16, wherein the processor is programmed to scan devices and/or data flows on a network and/or a subnetwork to identify devices and device profile information.

19. The system of claim 16, wherein the processor is programmed to web-scrape data sources to deliver device information and/or device breach information.

20. The system of claim 16, wherein the processor is programmed to:
source data from the data storage containing root-causes associated with each incident response;
generate threats associated with one or more vulnerabilities; and
store the threat indicators in a data storage.

* * * * *